(12) United States Patent
Haider et al.

(10) Patent No.: US 11,642,685 B2
(45) Date of Patent: May 9, 2023

(54) SYSTEM WITH A SPRAYING NOZZLE UNIT AND METHOD FOR SPRAYING AN INORGANIC MASS

(71) Applicant: Refractory Intellectual Property GmbH & Co. KG, Vienna (AT)

(72) Inventors: Matthäus Haider, Vienna (AT); Christian Manhart, Bruck a.d. Mur (AT)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 74 days.

(21) Appl. No.: 16/313,386

(22) PCT Filed: Jul. 26, 2017

(86) PCT No.: PCT/EP2017/068888
§ 371 (c)(1),
(2) Date: Dec. 26, 2018

(87) PCT Pub. No.: WO2018/019887
PCT Pub. Date: Feb. 1, 2018

(65) Prior Publication Data
US 2019/0168247 A1 Jun. 6, 2019

(30) Foreign Application Priority Data
Jul. 28, 2016 (EP) .................................. 16181666

(51) Int. Cl.
*B05B 12/00* (2018.01)
*B05B 7/14* (2006.01)
(Continued)

(52) U.S. Cl.
CPC .......... *B05B 12/004* (2013.01); *B05B 7/1431* (2013.01); *B05B 12/1418* (2013.01);
(Continued)

(58) Field of Classification Search
CPC .... B05B 12/004; B05B 12/085; G01N 29/14; G01N 29/22; G01N 29/46; G05D 11/135; E04F 21/08
(Continued)

(56) References Cited

U.S. PATENT DOCUMENTS 4,734,681 A * 3/1988 Suzuki .................... B05B 12/08
340/608
5,004,152 A * 4/1991 Baker ...................... B01J 4/008
239/61
(Continued)

FOREIGN PATENT DOCUMENTS

CN 102549397 A 7/2012
JP S60131358 U 7/1985
(Continued)

OTHER PUBLICATIONS

Borenstein, Michael, Hedges, Larry, Rothstein, Hannah; "Introduction to Meta-Analysis"; Jul. 1, 2007 (Year: 2007).*
(Continued)

*Primary Examiner* — Cody J Lieuwen
(74) *Attorney, Agent, or Firm* — Calfee, Halter & Griswold LLP

(57) ABSTRACT

A system for applying an inorganic coating material to a surface (110) comprising: —a spray nozzle unit (50), having the following features: —a first end portion (51) with a first connection (11) for a first supply hose (10), for supplying a first component of the coating material, —a second end portion (52) for discharging the coating material from the spray nozzle unit (50), —a connection unit (60) for mixing and transporting components of the coating material from the first end portion (51) to the second end portion (52), —wherein the connection unit (60) comprises a mixing chamber (61) with at least one further connection (21,31) for supplying a second component of the coating material,
(Continued)

Figure 1:
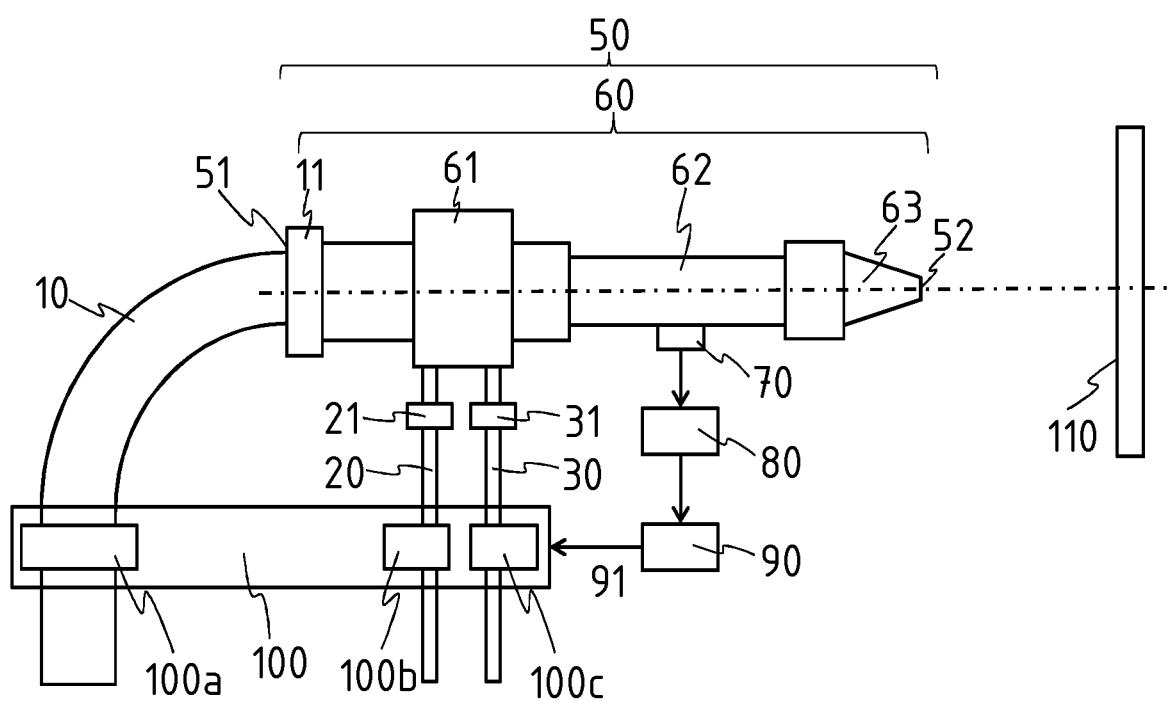

—and wherein at least one electronic sensor (70) is mounted on the connection unit (60), to detect an oscillation amplitude (81) arising at the connection unit (60), —a data processing unit (80), —a comparison unit (90), —a control unit (100), wherein the control unit (100) —generates a warning signal (101) when the control data (91) lie above a predetermined limit value, and/or—varies the volume flow (102) of at least one of the components of the coating material depending on the control data (91) is generated by the comparison unit (90). As well as methods for applying an organic coating material obtained by mixing a plurality of components in a spray nozzle unit (50).

14 Claims, 3 Drawing Sheets

(51) Int. Cl.
| | |
|---|---|
| *B05B 12/14* | (2006.01) |
| *B05B 13/04* | (2006.01) |
| *G01N 29/14* | (2006.01) |
| *G01N 29/46* | (2006.01) |
| *G05D 11/13* | (2006.01) |
| *G01N 29/22* | (2006.01) |
| *E04F 21/08* | (2006.01) |

(52) U.S. Cl.
CPC ......... *B05B 13/0431* (2013.01); *G01N 29/14* (2013.01); *G01N 29/22* (2013.01); *G01N 29/46* (2013.01); *G05D 11/135* (2013.01); *E04F 21/08* (2013.01)

(58) Field of Classification Search
USPC .......................................................... 239/71
See application file for complete search history.

(56) References Cited

U.S. PATENT DOCUMENTS

| | | | | |
|---|---|---|---|---|
| 5,193,406 A | * | 3/1993 | Wolf | G01F 1/666 |
| | | | | 73/865.9 |
| 2006/0225489 A1 | * | 10/2006 | Giles | G01N 29/14 |
| | | | | 73/64.53 |
| 2006/0265106 A1 | * | 11/2006 | Giles | A01C 23/007 |
| | | | | 700/283 |
| 2010/0132439 A1 | * | 6/2010 | Giles | G01N 29/14 |
| | | | | 73/64.53 |
| 2018/0141070 A1 | * | 5/2018 | Reichler | B05B 13/0431 |

FOREIGN PATENT DOCUMENTS

| | | |
|---|---|---|
| JP | 2000180308 A | 6/2000 |
| JP | 2005308255 A | 11/2005 |
| JP | 2002220288 A | 8/2022 |
| WO | 2004076075 A1 | 9/2004 |
| WO | 2007066660 A1 | 6/2007 |

OTHER PUBLICATIONS

"Korean Office Action for Korean Patent Application No. 10-2019-7006225", dated May 26, 2022, 15 pages.
"Search Report for Chinese Patent Application No. 201780036259.3", dated Sep. 23, 2020, 8 pages.
"First Office Action for Chinese Patent Application No. 201780036259.3", dated Sep. 23, 2020, 7 pages.
"Second Office Action for Chinese Patent Application No. 201780036259.3", dated May 14, 2021, 9 pages.
"First Examination Report for Indian Patent Application No. 201817046541", dated Dec. 29, 2020, 6 pages.

* cited by examiner

SYSTEM WITH A SPRAYING NOZZLE UNIT AND METHOD FOR SPRAYING AN INORGANIC MASS

This application claims priority of the earlier application filed on Jul. 28, 2016, at the European Patent Office under application No. EP16181666, the contents of this earlier application is hereby incorporated by reference in their entirety.

The invention relates to a spray nozzle unit, a system, a method and a use of a spray nozzle unit for applying an inorganic coating material, in particular an inorganic mass (also sometimes referred to as mix), to a surface, for example the surface of a metallurgical vessel. The term inorganic mass comprises, in particular, ceramic masses, in particular refractory masses/monolithics, which have a consistency which may be continuously sprayed with a nozzle (spray nozzle unit). An inorganic mass is understood to mean, in particular, a mass consisting of at least 80 wt.-% or more particularly at least 95 wt.-% of inorganic material.

Such refractory coating materials (masses) are used in the lining of industrial plants (furnaces, rotary kilns, shaft kilns, etc.), in particular metallurgical vessels (converters, ladles, electric arc furnaces, tundishes and other vessels for the melting of metals), which are exposed to high temperatures (>1000° C.).

The inorganic coating material is obtained, for example, by conveying a dry mixture (dry mass) to a spray nozzle unit and mixing it with other components (e.g. water, binding agent). The application is carried out by spraying the resultant coating material through the spray nozzle unit (for example via a nozzle head) in the direction of a surface. This process is known in the art as dry-mix shotcreting.

In dry-mix shotcreting, the operator usually adjusts the content of water (or a liquid binding agent) at the beginning of the spraying in order to obtain the desired consistency of the coating material and thus the optimal adherence of the coating material to the surface. By visual control of the rebound, the quality of the consistency is monitored by the operator during the entire spraying process.

By the "consistency" of an inorganic coating material is generally understood the stiffness and processability of the freshly applied mass, i.e. not of the cured mass. Consistency may be subdivided into areas which fall in a specific range of the degree of slumping and/or compaction (analogous to DIN 1045/EN 206 for concrete).

A possible embodiment of a spray nozzle unit for the dry spraying process is disclosed in DE 198 19 660 A1.

In the context of automation and increased safety, the spray nozzle unit is attached to a manipulator such as a robot arm. Such applications are described, for example, in EP 2 255 905 A1 or WO 03/081157 A1. In this way it is also possible to use sensors which measure the inner surface of a metallurgical vessel, carry out temperature measurements, or measure a residual strength of the refractory lining.

Consistent adherence of the coating material to the surface is necessary within the context of a fully or partially automated application of the inorganic coating material. This requires a uniform consistency of the coating material.

Due to process fluctuations (such as flow rates varying over time, different application situations, such as "upwards" or "downwards," etc.), it is necessary in practice that the operator repeatedly adapts the flow rates (the volume flow) of the components of the coating medium during the spraying process in order to achieve a uniform result. By "volume flow" is meant the quantity (measured in volume or mass) of a component flowing per unit of time, for example, the number of kilograms of mass per minute or the number of liters of liquid per minute.

If deviations occur between the respective actual consistency of the coating medium and an (optimized) target consistency (e.g. in the case of a non-optimal ratio between the liquid component, such as water, with respect to the dry component, such as the refractory mass), the following problems may arise:

- if the liquid component quantity is too high, the porosity of the coating medium becomes too high, leading to long drying times and poor initial adhesion of the coating medium to the surface to be coated ("run off"),
- "spalling" is caused by high vapor pressure in the still undried layers, which can not escape through the already dried outer layer and leads to a detachment of the material from the surface,
- if the amount of the liquid component quantity is too low, this leads to dust formation and the loss of fine particles (demixing of the proportions) as well as poor initial adhesion of the coating medium to the surface to be coated, i.e. increased rebound.

In order to document the quality of the result obtained of the coating of a surface, it may be important to provide documentation of the coating; in particular verification of a uniformly suitable consistency of the coating material is desired.

Against this background, it is an object of the invention to provide a spray nozzle unit, a system and a method which allows continuous monitoring of the consistency (and thus of the quality) of a, in particular refractory, inorganic coating material during application (spraying).

The object is achieved according to the invention by a system according to claim 1 and a method with the features according to claim 9. Advantageous refinements, developments and variants are the object of the subclaims. The advantages and refinements mentioned in connection with the method also apply analogously to the products/physical objects.

The core idea of the invention is based, in particular, on the finding that the structure-bourne sound (mechanical vibrations) produced in parts of the spray nozzle unit, or the oscillation amplitude resulting therefrom and detectable on the surface of the spray nozzle unit, allows conclusions to be drawn about the consistency of the inorganic coating material located in the spray nozzle.

In the following, "oscillation amplitude" is understood as the time profile of a detected oscillation. Mathematically speaking, this is a continuous function $g(t)$ or its discrete values at specific times $g(t_i)$.

In the following, a "frequency spectrum" is understood as the representation of the oscillation amplitude in a specific time interval in the frequency domain. These are, therefore, coefficients (the frequency amplitude values) of the oscillations from which the oscillation amplitude is composed in a specific time interval. The frequency amplitude values $G(f_j)$ of the respective frequency components are obtained as a function of the frequency $f_j$, or their temporal progression $(G(t,f_j))$.

In one aspect of the invention, the object is achieved by providing a system for applying an inorganic coating material, in particular a refractory coating material, to a surface, in particular the surface of a metallurgical vessel, comprising the following features:
a spray nozzle unit according to the invention, having the following features:
a first end portion with a first connection for a first supply hose to supply a first component of the coating material,
a second end portion for the discharge of the coating material from the spray nozzle unit,
a connection unit for mixing and transporting components of the coating material from the first end portion to the second end portion,
wherein the connection unit comprises a mixing chamber with at least one further connection for the supply of a second component of the coating material,
and wherein at least one electronic sensor is mounted on the connecting unit to receive a oscillation amplitude arising at the connecting unit
a data processing unit to acquire the oscillation amplitude detected by the electronic sensor of the spray nozzle unit and to calculate an actual frequency spectrum or target frequency spectrum from the oscillation amplitudes detected,
a comparison unit to compare an actual frequency spectrum with a target frequency spectrum, for generating control data,
a control unit,
wherein the control unit
generates a warning signal if the control data lie outside a defined range or above a predetermined limit value, and/or:
varies (changes) the volume flow of at least one of the components of the coating material depending on the control data generated by the comparison unit.

A data processing unit, a comparison unit, a control unit are understood to mean one or more devices for carrying out the respective method steps described below, and which, for this purpose, comprise either discrete electronic components in order to process signals, or which are implemented partially or completely as a computer program in a computer.

The data processing unit is connected to the sensor of the spray nozzle unit and can carry out the following method steps:

The signals of the sensor (oscillation amplitude) are continuously monitored and these signals are converted into a frequency spectrum (frequency amplitudes).

Acquisition of the oscillation amplitude is preferably done by electronic means, e.g. by digitizing the electrical signals from the sensor and subsequently digitally storing the digitized data on a data carrier or in the memory of a computer.

The conversion (transformation) of the oscillation amplitudes into frequency amplitudes, i.e. the calculation of a frequency spectrum (frequency transformation), is done, for example, through Fourier transformation or a Fast Fourier transformation.

The frequency spectrum is calculated from the oscillation amplitudes of a particular time interval. The time interval is in the range of 10 milliseconds to 5 seconds.

The target frequency spectrum may be calculated in advance (e.g. at a time t=0 or alternatively at a defined time $t=t_{OPT}$) from a detected oscillation amplitude. The oscillation amplitude is referred to as a "target signal" in the case of the presence of an optimal consistency; in this case the frequency spectrum is referred to as the "target frequency spectrum".

The actual frequency spectrum may be calculated in real-time (during operation, e.g. at time t>0 or alternatively $t>t_{OPT}$) from a detected oscillation amplitude. In this case, the oscillation amplitude is referred to as the "actual signal". In this case, the frequency spectrum is referred to as the "actual frequency spectrum".

The oscillation amplitude g ($g(t_0)$, $g(t_1)$, $g(t_2)$ ... values: electrical current or voltage/potential) as a function of discrete time values $t_0$, $t_1$, $t_2$ of the sensor is converted through transformation into frequency amplitude values G as a function of discrete frequencies $f_j$. The transformation (FT for frequency transformation) is applied to a specific time interval (e.g. at the times $t_j$, where $i=i_0 \ldots i_1$), wherein a frequency spectrum is obtained at time $t=t_{i1}$ ($G(t_{i1},f_j)$).

$$G(t_{i1}, f_j) = FT(g(t_{i0}), \ldots, g(t_{i1}))$$

The frequency transformation FT is preferably a transformation which calculates a power spectrum from the harmonic oscillations of a signal function f (harmonic power in a signal), i.e.:

$$FT(f)=X(f)X^*(f)=|X(f)|^2$$

wherein $X(f)=FFT(f)=FFT(g(t_{i0}), \ldots, g(t_{i1}))$ is the so-called Fast Fourier transformation and $X^*(f)$ is the complex conjugation of $X(f)$.

The comparison unit can perform the following process steps:

The comparison unit compares two frequency spectra, in particular an actual frequency spectrum with a target frequency spectrum.

For this purpose, frequency components are obtained, for example, from the frequency spectra by summing the frequency amplitude values G over a defined frequency range ($\overline{G}_n (t) = \Sigma_{j=a}^{b} G(t, f_j)$). In particular, at least one actual frequency component is determined from the actual frequency spectrum and/or at least one target frequency component is determined from the target frequency spectrum by summing the respective frequency amplitude values over a specific frequency range.

Preferably, at least one frequency component ($\overline{G}_n (t) = \Sigma_{j=a}^{b} G(t, f_j)$) is calculated in the range of fj from (a=) 3000 Hz to (b=) 9300 Hz from the actual and target frequency spectra, respectively. A particularly good dependence of the consistency of the liquid/solid phase mixture was achieved in this range.

Optionally (additionally), the frequency components $\overline{G}_n$ (t) may be calculated as a moving average (sliding mean) value for smoothing the signal. Thus, for example, with $$\overline{G}_n(t) = \frac{1}{m}\sum_{i=0}^{m-1}\sum_{j=a}^{b} G(t-i, f_j)).$$

The length of the time interval via which the moving average value may be calculated is selected based on the data quality.

The calculation of the moving average value has the effect that short-term or high-frequency disturbances have no influence on the spraying result.

The comparison unit calculates control data by comparing the currently calculated frequency spectrum (actual frequency spectrum) or its computed frequency components (e.g. average amplitudes $\overline{G}_n$ (t) at time t) with a reference frequency spectrum (target reference spectrum) or its calculated frequency components (e.g. average amplitudes $\overline{G}_n$ (0) at time t=0). This reference/target frequency spectrum or its frequency components (target frequency components) are already stored in advance, for example in the comparison unit.

Control data are generated by comparing the two spectra.

In particular, the control data S(t) may be generated by weighted summation of the deviations (differences) between actual frequency components and target frequency components.

This may be effected, for example, by linear summation and/or by square summation of the differences of individual, or all, target/actual frequency components, respectively with weighting factors $a_n$:

$$S(t) = a^{(0)} + \sum_{n=n0}^{n1} a_n^{(1)} (\overline{G}_n(t) - \overline{G}_n(0)) + \sum_{n=n0}^{n1} a_n^{(2)} (\overline{G}_n(t) - \overline{G}_n(0))^2$$

or, alternatively, also by quotient formation of target and actual frequency components and by linear summation and/or by square summation of the quotients of individual, or all, target/actual frequency components, in each case with weighting factors $a_n$:

$$S(t) = a^{(0)} + \sum_{n=n0}^{n1} a_n^{(1)} (\overline{G}_n(t) / \overline{G}_n(0)) + \sum_{n=n0}^{n1} a_n^{(2)} (\overline{G}_n(t) / \overline{G}_n(0))^2$$

The weighting factors may be obtained either by empirical studies, by mathematical models from simulation calculations, or by computer-assisted learning (e.g. in the manner of a neural network).

The weighting factors may also be obtained by varying the volume flow of the components of the coating material.

The control data S(t) are generated by the comparison unit and made available to the control unit.

The control unit may, for example, issue a warning signal if the control data lie outside a defined range, e.g. if S(t) exceeds a certain predefined limit value. The warning signal may be acoustic (emission of a sound), optical (e.g. by a warning lamp or a display on a screen). The warning signal may also be fed to a further control unit, in particular the warning signal may lead to the ending of the spraying process, in the sense of an emergency shutdown.

The control unit may, for example, change the volume flow of at least one of the components of the coating material, as a function of the control data S(t), wherein at least one electrically-controllable valve is provided in the control unit.

The control is preferably performed by varying the volume flow of the second component by adjusting the volume flow of the second component as a function of the control data S(t). This serves for the fast and accurate adjustment of the consistency since the flow of a non-solid (e.g. liquid) component may be adjusted quickly and precisely.

The electrically-controllable valve for varying the volume flow of the second component is, for example, an electrically-controllable needle valve, since the most precise regulation is achieved in this way.

Thus, the volume flow of water may be reduced through a simple control as a function of the control data (e.g. S>0), or increased (e.g. S<0) by regulating the electrically-controllable valve.

The regulation may, additionally or alternatively, also be effected by varying the volume flow of the first component. This may be achieved by adjusting the delivery rate of the controllable delivery pump, wherein a variation in the delivery rate of the first component is achieved. This enables the simple and robust adjustment of the consistency and thus of a long-lasting apparatus, since reliable regulation may be achieved here without additional components (valves or similar), or even in the event of failure of such components.

Thus, the volume flow of dry mass may be increased through simple regulation as a function of the control data (e.g. S>0), or reduced (e.g. S<0), by controlling the delivery pump.

The most consistent results were obtained with a proportional-integral-derivative controller (PID controller).

The control data may be stored for subsequent quality control.

The system may, for example, comprise a manipulator which is so mechanically connected to the spray nozzle unit that it allows application to a hard-to-access surface, such as the inner surface of a metallurgical vessel. For applications in the steel industry, such hard-to-access surfaces are often present, especially due to the high temperature of such a surface, so that an operator must then remain at a very large distance, or in narrow areas or dangerous areas.

The connection of the spray nozzle unit and the manipulator may preferably be effected by means of a rotatable connection.

The manipulator may be mounted at its first end portion on the ground or on another fixed device (such as, e.g., the working platform of a ladle maintenance plant) in a moveable and/or rotatable manner.

The manipulator may, in particular, be designed in the manner of a robot arm, and comprises various kinematics known in robot technology.

The spray nozzle unit may be part of the manipulator as a whole or in parts. For example, the pipe of the connection unit may be an arm of the manipulator.

The system according to the invention may further comprise additional sensors, such as, for example, for temperature measurements or for optical inspection of the surface to be coated.

The control data may be used to control the manipulator. For example, it may be provided that, if the control data is above a predetermined limit value, the manipulator is stopped or a forward movement of the manipulator is slowed. This serves for an automated error-free application of the coating material.

The manipulator may, alternatively, also be a manually operated lance or an extension pipe.

A spray nozzle unit according to the invention for applying an inorganic coating material, in particular an inorganic refractory coating material, to a surface, in particular the surface of a metallurgical vessel, has at least the following features:
  a first end portion with a first connection for a first supply hose, for supplying a first component of the coating material,
  a second end portion for the discharge of the coating material from the spray nozzle unit,
  a connection unit for mixing and transporting components of the coating material from the first end portion to the second end portion,
  wherein the connection unit comprises a mixing chamber with at least one connection for feeding a second component of the coating material,
  an electronic sensor mounted on the connection unit to detect an oscillation amplitude arising at the connection unit.

The inorganic coating material is preferably a refractory inorganic mass. In such refractory inorganic masses (refractory materials), the precise adjustment of the liquid component is particularly important when applied by the dry-mix shotcreting method, and the following problems arise in addition to those already mentioned in the case of deviations from the target consistency:

- an exact water content is very important for the ceramic bonding customary in refractory materials (in contrast to the hydraulic bond in concrete), as even small deviations from an optimal water content lead to a reduced quality of the resulting coating,
- high safety requirements apply in the area of the application of refractory materials,
- in the case of refractory materials, only the optimal "minimum quantity" of water may be used, since an excessively high water content may otherwise lead to the destruction of the coating at high temperatures,
- in general, no liquefiers are used for refractory materials, and, therefore, the adjustment of an optimal consistency (e.g. purely through the addition of water) in the case of refractory materials is much more difficult.

The first supply hose (delivery hose) usually provides a dry mass as a first component via a first connection of the spray nozzle unit. This is usually done by introducing the dry mass into an air stream.

The first component is designed for coating a metallurgical vessel, such as converters, ladles, electric arc furnaces, tundishes. The first component is generally a solid, such as a dry basic refractory mass. For example, it may be a magnesia mass.

Conventional grains lie in the range 0-5 mm, in particular 0-3 mm.

In the following, the end portion is in particular a free end of a component.

The connection unit may be so designed that the connection unit may comprise a substantially step and kink-free path between the first end portion of the spray nozzle unit and the second end potion of the spray nozzle unit. In other words, there is no discontinuous change in the flow characteristics of the first component of the coating material between the first end portion and the second end portion. This avoids clogging of the spray nozzle unit and avoids increased wear by abrasion in the spray nozzle unit.

The spray nozzle unit is designed for standard delivery rates for the first component in the range 50-350 kg/min.

The connection unit comprises at least one mixing chamber in which the first component is mixed with at least one second component.

For this purpose, the second component is fed to the mixing chamber via a second supply hose via a second connection.

The second component is generally a non-solid component, i.e. no solid matter. The second component may be a liquid component, for example water, or alternatively a binding agent in aqueous solution, for example a sol, in particular a sol of dispersed silicon dioxide. The pressure of the second component may lie in the range from 1 bar to 40 bar. The usual amount of the second component is in the range 2-15 wt.-% based on the first component.

Further connections to the mixing chamber are possible; a third component may be fed to the mixing chamber via a third supply hose via a third connection. The third component may, for example, be a gaseous component, for example compressed air.

The pressure of the third component may be in the range from 1 bar to 40 bar. This allows the second component to be mixed with the third component in an antechamber (i.e., for example, the compressed air may then be used to disperse the water in the finest drops). Improved intermixing of all three components is achieved through the principle of the dual substance nozzle (so-called binary nozzle).

At least one electronic sensor is mounted on the connection unit, which can detect an oscillation amplitude occurring at the connection unit.

The sensor is preferably mounted on an outer surface of the connection unit and is form-fittingly connected to the connection unit.

The sensor may be mounted on the mixing chamber of a spray nozzle unit. Errors or changes in the mixing process are detected in this area (e.g. clogged nozzles of the e.g. second component, wear in the mixing chamber and the like).

When using a sensor which is mounted on the mixing chamber of a dual-substance nozzle for mixing the first component of a basic refractory mass, with water as the second component, and compressed air as the third component, errors or changes in the mixing process may be detected directly (i.e. very quickly) and thus very small fluctuations in the application quality of the coating material on a surface may be detected.

The connection unit may further comprise a pipe. The pipe is connected at its first end part with the mixing chamber of the connection unit, so that the components of the coating medium are brought together in the mixing chamber and are already premixed when fed into the pipe. The pipe has the task of further improving the mixing of the components (homogeneity) as well as reducing and largely laminarizing the turbulent flows (present in the mixing chamber). The pipe may, in particular, be in the form of a straight or curved hollow cylinder. The length of the pipe is preferably in the range 5 cm to 10 m.

In particular, a long pipe of about more than 5 m in length may serve to ensure mixing in a low-temperature zone since, in this case, the mixing chamber is at least at a distance equal to the length of the pipe from the hot surface to be coated.

The connection unit may also include a nozzle head. The nozzle head has the task of forming the stream of the coating medium. The nozzle head is connected at its first end part to the mixing chamber of the connection unit or to the second end part of the pipe, so that the components of the coating medium, which are already premixed in the mixing chamber, are directed into the nozzle head, possibly via the pipe. The nozzle head may, in particular, have a varying, for example narrowing, cross-section. In this embodiment, the nozzle head or the second (open) end part of the nozzle head forms the second end portion of the spray nozzle unit.

The coating medium leaves the spray nozzle unit via the second end portion of the spray nozzle unit in the direction of a surface to be coated.

The sensor is preferably mounted on the pipe. In other words, the sensor forms a form-fitting connection with the pipe, wherein the connection is such that normal oscillations of the pipe surface may be detected by the sensor.

Mounting the sensor on the pipe achieves the best signal quality (i.e. the lowest fluctuations). This is attributed to the fact that the flow conditions in the pipe correspond most closely to a laminar flow, while the flow conditions in the mixing chamber or in the nozzle head are rather turbulent in nature.

In combination with a long pipe over 5 m in length, there is the additional advantage that the temperature is significantly lower when used in a metallurgical vessel in the region of the mixing chamber or at the pipe end part of the pipe adjoining the mixing chamber than in the front part of the spray nozzle unit.

Advantageous results show mounting positions of the sensor on the pipe in the range of up to 1 m, alternatively in the range of a distance of up to 20 times, preferably up to 10 times the inner diameter of the pipe (the inner diameter of the pipe preferably lies in the range 5 to 15 cm), distal from the pipe end part adjoining the mixing chamber. The lowest temperatures and good flow conditions will also occur in this range.

Particular preference is given to a mounting position of the sensor on the pipe in the range 0.5 m to 1 m, alternatively in the range between 5 to 20 times, preferably between 5 to 10 times the inner diameter of the pipe, distal from the pipe end part adjoining the mixing chamber. Uniform consistency is also found in this range, while noise is not produced by mixing movements (as in the vicinity of the mixing chamber).

Thus, the sensor needs to be less protected against temperature radiation while achieving a longer life of the sensor.

In one embodiment, a plurality of sensors is mounted in the same mounting position on the pipe, but distributed over the circumference of the pipe. In other words, a plurality of sensors is mounted on the surface of the pipe, wherein each of the sensors is equidistant from the pipe end part adjoining the mixing chamber. Preferably, three sensors are provided in this embodiment, wherein, preferably, the three sensors are evenly distributed over the circumference of the pipe, i.e. they form an angle of 120° with respect to one another, at the pipe center (axis). This permits the determination of inhomogeneities in the coating material since the acoustic information is obtained from several sides.

In one embodiment, the connection unit consists of a mixing chamber, a pipe and a nozzle head. The components of the inorganic coating material are first brought together in the mixing chamber and are premixed, then further homogenized in the pipe, then the flow is laminarized, and passed into the nozzle head. The ready mixed inorganic mass is directed onto the surface to be coated by means of the nozzle head and leaves the spray nozzle unit through the nozzle head.

The sensor detects the oscillation amplitude which is produced at the connection unit, i.e. the structure-bourne sound. This is done according to the principle of acceleration measurement. In particular, the deflections of an oscillation normal to the surface of the connection unit are recorded. The sensor therefore generally provides acceleration values, which are normal to the surface of the connection unit, in the form of a sequence of electrical values (power or potential) as a function of the time.

Sound influences from the environment are detected only to a very limited extent with this method and are not disturbing.

The sensor is designed as an oscillation sensor and is preferably selected from the group consisting of: laser vibrometer, piezoelectric accelerometer, piezo-resistive sensor, strain gauges, capacitive acceleration sensor, magneto-resistive acceleration sensor. By using one of these acceleration sensors, sound influences from the environment (such as secondary noises) may be largely excluded.

Conventional sound sensors, such as microphones, are disadvantageous or even unsuitable, since many background noises are picked up.

The sensor is preferably a piezo-electric acceleration sensor, which is form-fittingly connected to a part of the connection unit by a rigid connection.

By using a piezoelectric acceleration sensor, environmental influences (such as secondary noises) may be largely excluded and, at the same time, high reproducibility and longevity of the spray nozzle unit may be achieved.

For example, the sensor may be integrated into a clamp (bracket), which is a part of the connection unit. This allows easy interchangeability.

The components of the spray nozzle unit preferably consist of an abrasion-resistant material. Thus, in particular, the connection unit, i.e. the mixing chamber, the pipe and the nozzle head, may be made of steel.

In a further aspect of the invention, the object is achieved by providing a method for applying an inorganic coating material obtained by mixing several components in a spray nozzle unit according to the invention to a surface, in particular the surface of a metallurgical vessel, comprising the steps:

Measuring the oscillation amplitude detected by the electronic sensor of the spray nozzle unit during mixing and transport of components of a coating material through the connection unit of the spray nozzle unit, Calculating an actual frequency spectrum from the measured oscillation amplitudes, Generating control data by comparing an actual frequency spectrum with a stored target frequency spectrum, as well as Generating a warning signal when the control data lie outside a defined range, and/or Variation of the volume flows of the components of the coating material as a function of the control data generated by the comparison unit.

The method is used to check the consistency of an inorganic coating material obtained by mixing several components in a spray nozzle unit according to the invention.

The method is carried out in one aspect using a spray nozzle unit according to the invention, wherein the spray nozzle unit comprises, for example, the following features:

A first end portion with a first connection for a first supply hose, for supplying a first component of the coating material, A second end portion for the discharge of the coating material from the spray nozzle unit, A connection unit for mixing and transporting components of the coating material from the first end portion to the second end portion, wherein the connection unit has a mixing chamber with at least one further connection for feeding a second component of the coating material, and at least one electronic sensor is mounted on the connection unit for detecting an oscillation amplitude arising at the connection unit.

The method is thus carried out using a spray nozzle unit according to the invention, wherein a dry, in particular a refractory, first component of the coating material is preferably provided by the first supply hose to the spray nozzle unit, and a liquid, in particular an aqueous, second component of the coating material is preferably provided by the first supply hose to the spray nozzle unit. The components provided are mixed in the connection unit of the spray nozzle unit. An electronic sensor mounted on the connection unit detects the oscillation amplitude arising at the connection unit. The mixed coating material is directed to the second end portion of the spray nozzle unit and there leaves the spray nozzle unit in the direction of the surface to be coated. The mixed coating material strikes the surface to be coated, dries, and then forms the coating of the surface.

The dry, in particular refractory, first component of the coating material is provided, for example, by a suitable machine, e.g. a so-called Gunite or Dry-Gunning machine (also known under the name RHI Ankerjet, e.g. the types AJ10A . . . 40A).

In principle, the dry, in particular refractory, first component is provided in a storage container of such a suitable machine, and then transported, by an air flow produced in such a machine or by an external compressor or the like, through the first supply hose to the first connection of the spray nozzle unit. The pressure in the first supply hose may be in the range from 0.5 to 8 bar.

The liquid, in particular aqueous, second component of the coating material is transported by a suitable pump through the second supply hose to the second connection of the spray nozzle unit. The pressure in the second supply hose may be in the range 1.5 to 8.5 bar. The pressure in the second supply hose is preferably the same or around 0.5 bar higher than in the first supply hose.

Detection of the oscillation amplitude detected by the electronic sensor of the spray nozzle unit is carried out continuously (i.e. at the current actual consistency) during the mixing and transport of the components of the coating material.

The target frequency spectrum may be obtained in advance by the following steps:
 Setting/defining a target consistency of the coating material by varying the volume flows of the components of the coating material (until the consistency is selected to be of good quality),
 Measuring the oscillation amplitude by the electronic sensor of the spray nozzle unit when the coating material is mixed and transported with the target consistency by the connection unit of the spray nozzle unit,
 Calculating a target frequency spectrum from the measured oscillation amplitudes,
 Storing the target frequency spectrum (e.g. in a computer memory).

A further aspect of the invention relates to the use of a spray nozzle unit according to the invention for applying an inorganic coating material, in particular an inorganic mass, to a surface, for example to a surface of a metallurgical vessel.

A further aspect of the invention relates to the use of a system according to the invention for applying an inorganic coating material, in particular an inorganic mass, to a surface, for example to a surface of a metallurgical vessel.

Figure 2:
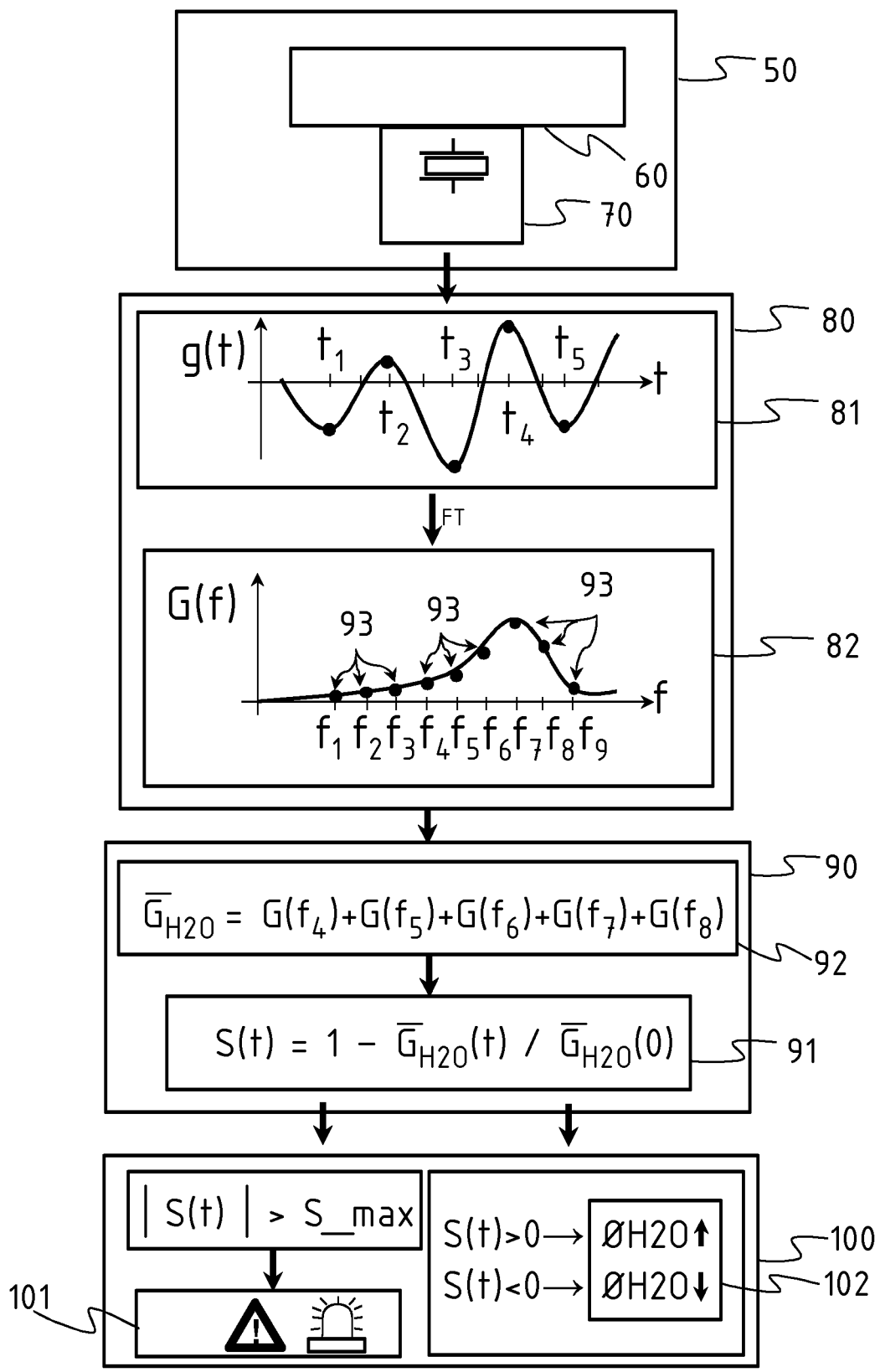
Figure 3A:
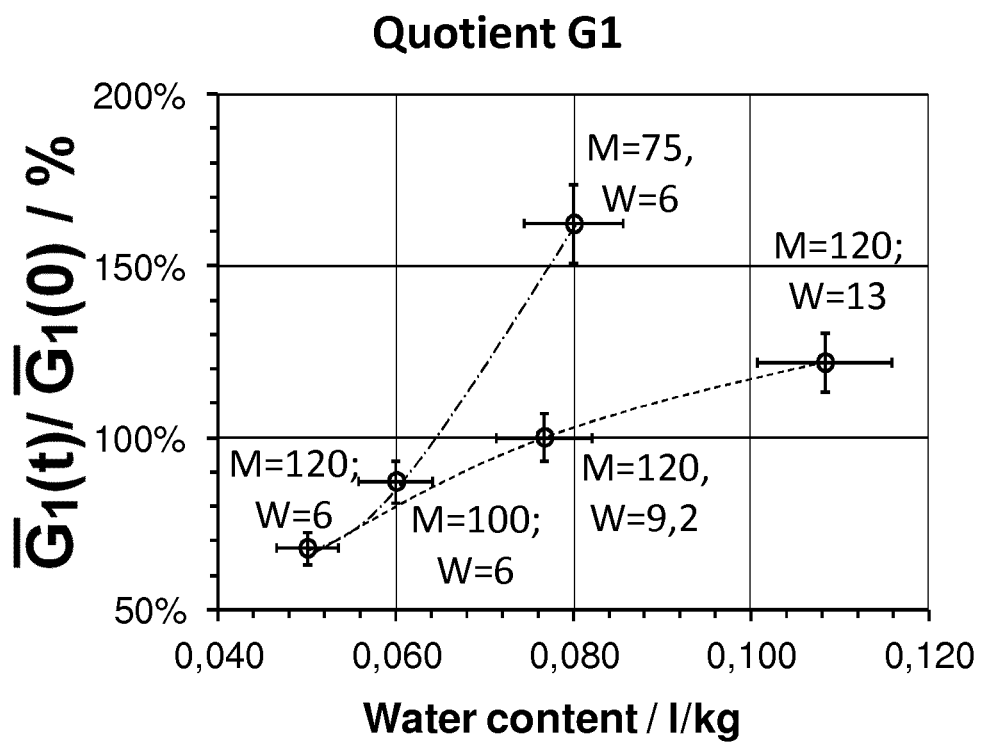
Figure 3B:
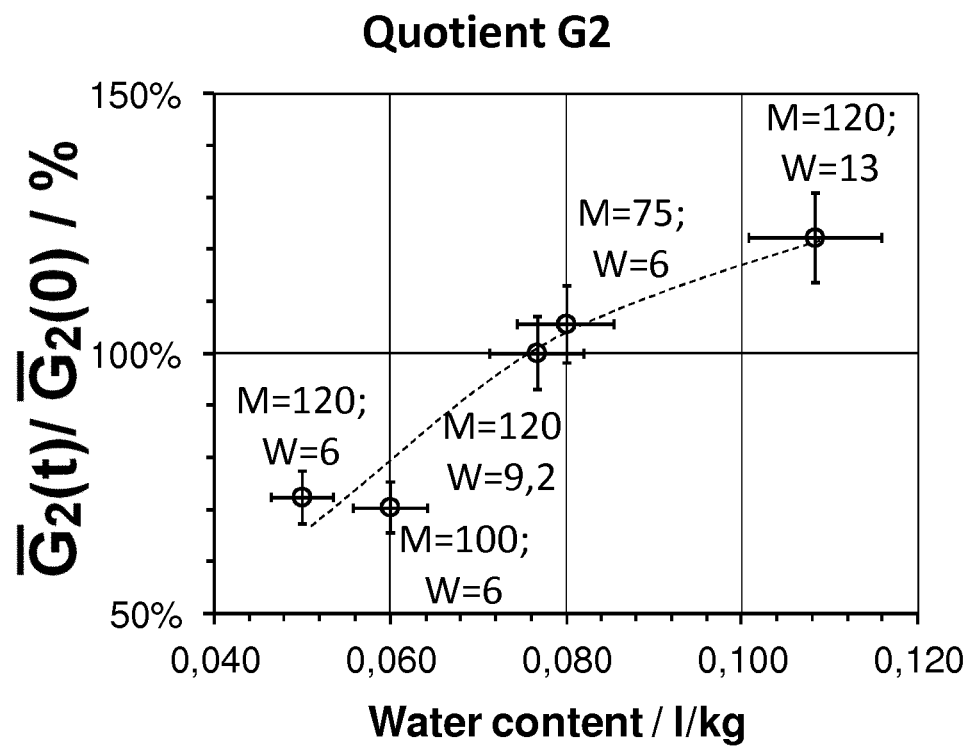

Exemplary embodiments of the invention are explained in more detail by means of illustrations:

FIG. 1 shows a schematic representation of the spray nozzle unit according to the invention, FIG. 2 shows a schematic sequence of the method according to the invention, FIG. 3a and FIG. 3b show an exemplary diagram of quotients of actual frequency components and target frequency components.

EXEMPLARY EMBODIMENT 1

FIG. 1 shows a first supply hose (delivery hose) 10 which conveys the basic mass (Ankerjet NP 12, basic mass, 0-3 mm granulation band, highly refractory), so that the latter passes through the first end portion 51 of the spray nozzle unit 50 to the mixing chamber 61 via the first connection 11. Water passes through the second supply hose 20 into the mixing chamber 61 via the second connection 21. Compressed air reaches the mixing chamber 61 via the third connection 31 via the third supply hose 30. The coating material is formed in the mixing chamber 61 from the components of the basic mass of the Ankerjet NP 12, wherein water and air are mixed and transported through the pipe 62 (length: 2 m) into the nozzle head 63, and then leaves the spray nozzle unit 50 via the second end portion 52 and from there to the surface 110 to be coated. The spray nozzle unit 50 consists of steel. A piezoelectric sensor 70 is form-fittingly connected to the pipe 62 at the center of the pipe 62 (i.e. 1 m distal from the pipe end part adjoining the mixing chamber 61, or 10 times the pipe diameter, the pipe diameter being 10 cm) and detects an oscillation amplitude 81 emerging in the pipe 62, which is acquired by the data processing unit 80. The data processing unit 80 is connected to the comparison unit 90 and controls the control unit 100 through the control data 91 to regulate the through-flow/ volume flow 102 of the components by means of a controllable delivery pump (100a) or controllable electrical valves (100b, 100c) of the coating material.

FIG. 2 shows the piezoelectric sensor 70 (here: ICP accelerometer, Model Number 352C33) mounted on the pipe 62 of the connection unit 60, which supplies an analog data signal to the data processing unit 80. The data processing unit 80 in this exemplary embodiment is a computer using the software LabView. The analog data signal is first digitized (16 bits, 51,400 Hz), so that a time-dependent oscillation amplitude 81 is obtained. This is converted continuously into an FFT (Fast Fourier Transformation) module into a frequency spectrum 82, so that frequency amplitude values 93 are obtained (over a time interval of the oscillation amplitude of 250 ms). Three frequency components 92 are continuously calculated from the frequency amplitude values 93 by averaging the frequency amplitude values 93 in a range of 1-2999 Hz ($\overline{G1}$ (t)), 3000-9300 Hz ($\overline{G2}$ (t)) and 9301-12000 Hz $\overline{G3}$ (t)). The values $\overline{G1}$ (t), $\overline{G2}$ (t) and $\overline{G3}$ (t) are calculated for further processing as a moving average over a time interval of 15 seconds. Control data 91 are then calculated from the frequency amplitude values 93, and forwarded to the control unit 100. When a maximum value of the control data 91 is exceeded, the control unit outputs a warning signal 101 and regulates a volume flow 102.

The spray nozzle unit 50 in this exemplary embodiment is a binary nozzle. The dry mass (Ankerjet NP 12) is conveyed via the first supply hose 10 to the first connection 11 of the spray nozzle unit 50 by compressed air (conveying air) provided by a compressor (pressure 6 bar; the mass is introduced into the air flow by the "Ankerjet" machine, wherein the pressure in the air flow is 0.5 bar, the (air) flow rate is about 190 m3/h,). Water is fed directly from the drinking water line by means of a water pump WK155 under a pressure of about 1.5 bar via the second supply hose 20 to the second connection 21. The water volume is adjusted by means of an electrically-controllable valve 100b (the measurement of the exact volume flow of water is carried out by means of a flowmeter from the company Krohne DN 50, PN=40 [bar], Q=0-50 [m3/h], Output I=4-20 [mA]). The compressed air (atomizing air) is fed to the third connection 31 of the spray nozzle unit 50 via the third supply hose 30 at a pressure of 1.5 bar and 50 m³/h (supplied via a screw compressor from the company KAESER, type BSD 81 T (11.0 [bar] 400 [V])). The spray nozzle unit 50 is aligned horizontally in the direction of a surface 110 to be coated. The surface 110 is aligned at a distance of 3 m from the second end portion (52) of the spray nozzle unit 50 and essentially normal to the axis of the spray nozzle unit 50.

Table 1 shows the test results.

Control data 91 $S(t)=1-\overline{G}_1(t)/\overline{G}_1(0)$ may be formed here. When $|S(t)|>10\%$, a warning signal 101 is emitted by outputting a message on a screen.

TABLE 1 list of tests

| Test number | Volumeflow mass/kg/min | volumeflow water/l/min | Water content/l/kg | Result | $\overline{G}_1(t)/m/s^2$ | $\overline{G}_2(t)/m/s^2$ | $\overline{G}_3(t)/m/s^2$ | $\overline{G}_1(t)/\overline{G}_1(0)/\%$ | $\overline{G}_2(t)/\overline{G}_2(0)/\%$ | $\overline{G}_3(t)/\overline{G}_3(0)/\%$ |
|---|---|---|---|---|---|---|---|---|---|---|
| 1 | 120 | 6 | 0.050 | Too dry | 0.33 | 1.30 | 1.22 | 68% | 72% | 82% |
| 2 | 120 | 9.2 | 0.077 | opt. | 0.48 | 1.80 | 1.48 | 100% (*) | 100% (*) | 100% (*) |
| 3 | 120 | 13 | 0.108 | Too wet | 0.59 | 2.20 | 1.84 | 122% | 122% | 124% |
| 4 | 75 | 6 | 0.080 | opt. | 0.78 | 1.90 | 1.40 | 162% | 106% | 94% |
| 5 | 100 | 6 | 0.060 | Too dry | 0.42 | 1.27 | 1.04 | 87% | 70% | 70% | opt. = optimal //
(*) reference value

In test number 1, the flow rate of the basic mass is determined to be about 120 kg/min (volume flow). Water is added at 6 l/min (volume flow) (water content 0.050 l/kg of water in the mass). The result is judged to be too dry because partial dust formation occurs and a lot of mass rebounds from the surface 110 to be coated.

In test number 2, the water quantity is increased to 9.2 l/min (water content 0.077 l/kg; mass: 120 kg/min). The result is evaluated as being optimal, since a large part of the mass adheres to the surface 110 to be coated, no dust formation occurs, and the mass does not run off. A target frequency spectrum 82 is calculated from the oscillation amplitude 81 obtained at this optimal water content, and the three target frequency components 92 $\overline{G}_1(0)=0.48$, $\overline{G}_2(0)=1.80$ and $\overline{G}_3(0)=1.48$ calculated therefrom. These obtained values are used as the reference (target frequency components 92) for the remaining examples.

In test number 3, the water quantity is increased to 13 l/min (water content 0.108 l/kg, mass: 120 kg/min). The result is judged to be too wet because the mass partially runs off from the surface 110.

In test number 4, the mass is added at 75 kg/min from a water addition of 6 l/min (water content 0.080, mass: 75 kg/min). The result is evaluated as optimal, since a large part of the mass adheres to the surface 110 to be coated, no dust formation occurs, and the mass does not run off. However, in contrast to the result of test 2, only a reduced volume flow is used.

In test number 5, the mass is added at 100 kg/min from a water addition of 6 l/min (water content 0.060, mass: 100 kg/min). The result is judged to be too dry because partial dust formation occurs and a lot of mass rebounds from the surface to be coated.

The comparison of the target frequency components 92 ($\overline{G}_1(0)$, $\overline{G}_2(0)$ and $\overline{G}_3(0)$) obtained from test number 2 with the values obtained from the other tests (actual frequency components 92 $\overline{G}_1(t)$, $\overline{G}_2(t)$ and $\overline{G}_3(t)$) is exemplarily shown by quotient formation (i.e. $\overline{G}_1(t)/\overline{G}_1(0)$, $\overline{G}_2(t)/\overline{G}_2(0)$ and $\overline{G}_3(t)/\overline{G}_3(0)$).

FIG. 3a shows the curve of the quotient $\overline{G}_1(t)/\overline{G}_1(0)$ as a function of the water content (as a quotient of added water in l/min to supplied mass in kg/min). In the case of optimal consistency, a large difference is detected in the signal $\overline{G}_1(t)/\overline{G}_1(0)$ between an overall low volume flow ($\overline{G}_1(t)/\overline{G}_1(0)=162\%$ at a mass M=75 kg/min, water W=6 l/min) and a high volume flow, ($\overline{G}_1(t)/\overline{G}_1(0)=100\%$ [=reference] at a mass M=120 kg/min, water W=9.2 l/min). This value therefore allows the monitoring of a constant volume flow of the dry mass (Ankerjet NP12) in this exemplary embodiment.

FIG. 3b shows the course of the quotient $\overline{G}_2(t)/\overline{G}_2(0)$ as a function of the water content. The quotient $\overline{G}_2(t)/\overline{G}_2(0)$ shows a good correlation with the water content, independent of the volume flow of the dry mass. This value may therefore be used to control the volume flow of water 102 by setting control data 91 $S(t)=1-\overline{G}_2(t)/\overline{G}_2(0)$. When S<0, the volume flow of water is decreased by one unit (e.g. 0.1 l/min) by means of the electrically-controllable valve 100b. When S>0, the volume flow of water 102 is increased by one unit. With this regulation, a uniformly good consistency is obtained during long application times.

The curve of the quotient $\overline{G}_3(t)/\overline{G}_3(0)$ as a function of the water content is qualitatively similar to that of $\overline{G}_2(t)/\overline{G}_2(0)$ in FIG. 3b, therefore analogous conclusions also apply here.

LIST OF REFERENCE NUMERALS AND FACTORS

10 First supply hose (conveying hose)
11 First connection
20 Second supply hose
21 Second connection
30 Third supply hose
31 Third connection
50 Spray nozzle unit
51 First end portion of the spray nozzle unit
52 Second end portion of the spray nozzle unit
60 Connection unit
61 Mixing chamber
62 Pipe
63 Nozzle head
70 Sensor
80 Data processing unit
81 Oscillation amplitude
82 Frequency Spectrum
90 Comparison unit
91 Control data
92 Frequency components
93 Frequency amplitude values
100 Control unit
100a Controllable delivery pump
100b Electrically-controllable valve
100c Electrically-controllable valve
101 Warning signal
102 Volume flows
110 Surface to be coated

The invention claimed is:

1. System for applying an inorganic coating material to a surface (110), the system comprising:
a spray nozzle unit (50) comprising:
a first end portion (51), wherein a first connection (11) for a first supply hose (10) is coupled to the first end portion (51) of the spray nozzle unit (50), the first supply hose is for supplying a first component of the inorganic coating material,
a second end portion (52) having an open end, wherein the inorganic coating material is discharged from the spray nozzle unit (50) from the open end of the second end portion (52), and
a connection unit (60) for mixing components of the inorganic coating material and transporting the inorganic coating material from the first end portion (51) to the second end portion (52), the connection unit (60) positioned in the spray nozzle unit (50) between the first end portion (51) and the open end of the second end portion (52) of the spray nozzle unit (50), wherein the connection unit (60) comprises a mixing chamber (61), wherein the mixing chamber (61) has a second connection (21, 31) for a second supply hose that is coupled to the mixing chamber (61), wherein the second supply hose is for supplying a second component of the coating material to the mixing chamber (61),
a manipulator that is mechanically coupled to the spray nozzle unit (50), wherein the manipulator is configured to move the spray nozzle unit (50) relative to an inner surface of a metallurgical vessel to allow for coating of the inner surface of the metallurgical vessel with the inorganic coating material,
wherein at least one electronic sensor (70) is mounted on the connection unit (60) to detect an oscillation amplitude (81) arising at the connection unit (60),
a data processing unit (80) for acquiring the oscillation amplitude (81) detected by the electronic sensor (70) of the spray nozzle unit (50) and for calculating an actual frequency spectrum (82) or target frequency spectrum (82) from the oscillation amplitudes (81) detected,
a comparison unit (90) for comparing the actual frequency spectrum (82) with a target frequency spectrum (82) and generating control data (91), and
a control unit (100),
wherein the control unit (100)
generates a warning signal (101) when the control data (91) lie outside a defined range,
and/or
varies the volume flow (102) of at least one of the components of the coating material depending on the control data (91) generated by the comparison unit (90).

2. System according to claim 1, characterized in that the comparison unit (90) determines actual frequency components (92) and/or target frequency components (92) by summing the respective frequency amplitude values (93) from the actual frequency spectrum (82) and/or the target frequency spectrum (82) over a defined frequency range.

3. System according to claim 1, characterized in that the comparison unit (90) generates control data (91) from the weighted summation of the deviations or quotients between the actual frequency components (92) and the target frequency components (92).

4. System according to claim 1, characterized in that the connection unit (60) comprises a pipe (62) connected to the mixing chamber (61), wherein the sensor (70) is mounted on the pipe (62).

5. System according to claim 1, characterized in that the sensor (70) is a piezo-electric acceleration sensor.

6. System according to claim 1, characterized in that the sensor (70) is integrated into a clamp which surrounds the connection unit (60).

7. System according to claim 1, characterized in that the connection unit (60) between the first end portion (51) and the open end of the second end portion (52) of the spray nozzle unit builds a substantially step-free and kink-free path.

8. System according to claim 1, wherein the sensor outputs values that are indicative of accelerations arising at the connection unit, wherein the accelerations are normal to a surface of the connection unit, and further wherein at least one of the actual frequency spectrum or the target frequency spectrum is computed based upon the values that are indicative of accelerations arising at the connection unit.

9. Method for applying an inorganic coating to an inner surface of a metallurgical vessel, the method comprising the following steps:
providing a system, the system comprising:
a spray nozzle unit (50) comprising:
a first end portion (51), wherein a first connection (11) for a first supply hose (10) is coupled to the first end portion (51) of the spray nozzle unit (50), the first supply hose is for supplying a first component of the inorganic coating material,
a second end portion (52) having an open end, wherein the inorganic coating material is discharged from the spray nozzle unit (50) from the open end of the second end portion (52), and
a connection unit (60) for mixing components of the inorganic coating material and transporting the inorganic coating material from the first end portion (51) to the second end portion (52), the connection unit (60) positioned in the spray nozzle unit (50) between the first end portion (51) and the open end of the second end portion (52) of the spray nozzle unit (50), wherein the connection unit (60) comprises a mixing chamber (61), wherein the mixing chamber (61) has a second connection (21, 31) for a second supply hose that is coupled to the mixing chamber (61), wherein the second supply hose is for supplying a second component of the coating material to the mixing chamber (61),
a manipulator that is mechanically coupled to the spray nozzle unit (50), wherein the manipulator is configured to move the spray nozzle unit (50) relative to the inner surface of the metallurgical vessel to allow for coating of the inner surface of the metallurgical vessel with the inorganic coating material, wherein at least one electronic sensor (70) is mounted on the connection unit (60) to detect an oscillation amplitude (81) arising at the connection unit (60), and
a data processing unit (80) for acquiring the oscillation amplitude (81) detected by the electronic sensor (70) of the spray nozzle unit (50) and for calculating an actual frequency spectrum (82) or target frequency spectrum (82) from the oscillation amplitudes (81) detected, a comparison unit (90) for comparing the actual frequency spectrum (82) with a target frequency spectrum (82) and generating control data (91), and
a control unit (100),
measuring, by the data processing unit, the oscillation amplitude (81) detected by the electronic sensor (70) of the spray nozzle unit (50) during the mixing and transport of the inorganic coating material through the connection unit (60) of the spray nozzle unit (50)
calculating, by the data processing unit, the actual frequency spectrum (82), from the measured oscillation amplitudes (81),
generating, by the comparison unit, the control data (91) by comparing the actual frequency spectrum (82) with a stored target frequency spectrum (82), as well as
generating, by the control unit, a warning signal (101) when the control data (91) lie outside a defined range and/or varying, by the control unit, the volume flow (102) of at least one of the components of the coating material depending on the control data (91) generated by the comparison unit.

10. The method according to claim 9, characterized in that a calculation of actual frequency components (92) or target frequency components (92) is performed for the generation of control data (91) by summation of frequency amplitude values (93) over a specific frequency range of the actual frequency spectrum (82) or target frequency spectrum (82).

11. Method according to claim 9, characterized in that at least one frequency component (92) is calculated in the frequency range of 3000-9300 Hz.

12. Method according to claim 9, characterized in that the control data (91) are generated by the weighted summation of the deviations or quotients between the actual frequency components (92) and the target frequency components (92).

13. Method according to claim 9, characterized in that a target frequency spectrum (82) is obtained by the following steps:
setting a target consistency of the coating material by varying the volume flows (102) of the components of the coating material,
measuring the oscillation amplitude (81) detected by the electronic sensor (70) of the spray nozzle unit (50), when the coating material is mixed and transported with the target consistency by the connection unit (60) of the spray nozzle unit (50),
calculating a target frequency spectrum (82) from the measured oscillation amplitudes (81), and
storing the target frequency spectrum (82).

14. Method according to claim 9, characterized in that, further
a dry first component of the coating material is provided by the first supply hose (10) to the spray nozzle unit (50) and a liquid second component of the coating material is provided by the second supply hose (20) to the spray nozzle unit (50), wherein the first component and the second component of the coating material are mixed in the spray nozzle unit (50), and
the mixed coating material is directed to the second end portion (52) of the spray nozzle unit (50) and there leaves the spray nozzle unit (50) in the direction of the inner surface of the metallurgical vessel to be coated;
the mixed coating material then impinges on the inner surface of the metallurgical vessel to be coated and, after drying, forms the coating of the inner surface of the metallurgical vessel.

\* \* \* \* \*